US011955031B2

(12) United States Patent
Urano et al.

(10) Patent No.: US 11,955,031 B2
(45) Date of Patent: Apr. 9, 2024

(54) VEHICLE REMOTE INSTRUCTION TRAINING DEVICE

(71) Applicant: TOYOTA JIDOSHA KABUSHIKI KAISHA, Toyota (JP)

(72) Inventors: Hiromitsu Urano, Numazu (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 543 days.

(21) Appl. No.: 16/866,012

(22) Filed: May 4, 2020

(65) Prior Publication Data

US 2021/0043103 A1 Feb. 11, 2021

(30) Foreign Application Priority Data

Aug. 9, 2019 (JP) ................... 2019-147881

(51) Int. Cl.
*G09B 9/048* (2006.01)
*G09B 9/052* (2006.01)

(52) U.S. Cl.
CPC ............. *G09B 9/048* (2013.01); *G09B 9/052* (2013.01)

(58) Field of Classification Search
CPC ........ G06F 3/0482; G09B 9/048; G09B 9/052
See application file for complete search history.

(56) References Cited

U.S. PATENT DOCUMENTS 6,263,268 B1 * 7/2001 Nathanson ............. G07C 5/008
701/32.4
9,809,223 B2 * 11/2017 Watanabe ............. B60W 40/04
10,056,006 B1 * 8/2018 Hsu-Hoffman ........ G09B 9/052
(Continued)

FOREIGN PATENT DOCUMENTS

JP 2018-077649 A 5/2018
WO WO-2015135806 A1 * 9/2015 ............. G01C 21/32
WO WO-2018224407 A1 * 12/2018

OTHER PUBLICATIONS

DyLiacco et al., "Considerations in Developing and Utilizing Operator Training Simulations," IEEE Transactions on Power Apparatus and Systems, vol. PAS-102, No. 11, Nov. 1983, pp. 3672-3679. (Year: 1983).*

(Continued)

*Primary Examiner* — Eric J. Bycer
(74) *Attorney, Agent, or Firm* — Sughrue Mion, PLLC

(57) ABSTRACT

A vehicle remote instruction training device that trains a remote commander who issues a remote instruction to an actual autonomous vehicle includes: a commander interface including an information output unit that shows a situation of the actual autonomous vehicle to the remote commander and an instruction input unit for the remote commander to input the remote instruction to the actual autonomous vehicle; a virtual situation display unit that shows a virtual situation of a virtual vehicle with time variation to a remote commander who is a trainee through the information output unit; a remote instruction input recognition unit that recognizes an input of the remote instruction input into the instruction input unit; and an evaluation unit that evaluates the remote commander based on timing at which they issue the remote instruction with respect to the virtual situation of the virtual vehicle or on a content of the remote instruction.

8 Claims, 8 Drawing Sheets

(56) References Cited

U.S. PATENT DOCUMENTS

| | | | | |
|---|---|---|---|---|
| 10,402,771 | B1* | 9/2019 | De | H04W 4/027 |
| 10,625,676 | B1* | 4/2020 | Tsimhoni | H04N 5/44504 |
| 10,636,295 | B1* | 4/2020 | Kim | G08G 1/166 |
| 10,810,504 | B1* | 10/2020 | Fields | B60W 40/09 |
| 11,436,620 | B2* | 9/2022 | Stanciu | G06Q 20/065 |
| 2003/0083060 | A1* | 5/2003 | Menendez | H04W 88/02 455/423 |
| 2005/0015203 | A1* | 1/2005 | Nishira | B60W 50/16 340/436 |
| 2008/0027590 | A1 | 1/2008 | Phillips et al. | |
| 2010/0057358 | A1* | 3/2010 | Winer | G01C 21/3667 701/414 |
| 2010/0332876 | A1* | 12/2010 | Fields, Jr. | G06F 1/3203 713/323 |
| 2012/0039212 | A1* | 2/2012 | Kaliyaperumal | H04W 88/16 370/254 |
| 2016/0091897 | A1* | 3/2016 | Nilsson | B60W 40/04 701/25 |
| 2016/0293037 | A1* | 10/2016 | Jacques | G09B 9/02 |
| 2016/0321940 | A1* | 11/2016 | Banga | G09B 9/05 |
| 2017/0008522 | A1* | 1/2017 | Sato | G05D 1/0212 |
| 2017/0039871 | A1 | 2/2017 | Harkness | |
| 2017/0248959 | A1* | 8/2017 | Matsubara | B60W 10/04 |
| 2017/0349173 | A1* | 12/2017 | Nishiguchi | B60W 60/00 |
| 2017/0363430 | A1* | 12/2017 | Al-Dahle | G01C 21/32 |
| 2018/0067486 | A1* | 3/2018 | Yako | G05B 19/042 |
| 2018/0096597 | A1* | 4/2018 | Mortazavi | H04W 4/027 |
| 2018/0118219 | A1* | 5/2018 | Hiei | B60W 40/09 |
| 2018/0181118 | A1* | 6/2018 | Yoneda | G05D 1/0022 |
| 2018/0182261 | A1* | 6/2018 | Naouri | G09B 19/167 |
| 2018/0194354 | A1* | 7/2018 | Takeda | B60T 7/12 |
| 2019/0016345 | A1* | 1/2019 | Kitagawa | B60W 30/18163 |
| 2019/0108768 | A1* | 4/2019 | Mohamed | G09B 19/14 |
| 2019/0121923 | A1* | 4/2019 | Ringgenberg | G06F 30/20 |
| 2019/0155291 | A1* | 5/2019 | Heit | B60W 30/00 |
| 2019/0163176 | A1* | 5/2019 | Wang | G05D 1/0027 |
| 2019/0196464 | A1 | 6/2019 | Lockwood et al. | |
| 2019/0283741 | A1* | 9/2019 | Toda | B60W 10/20 |
| 2019/0355245 | A1* | 11/2019 | Gigengack | G08G 1/04 |
| 2019/0378413 | A1* | 12/2019 | Takamura | H04W 4/46 |
| 2020/0033866 | A1* | 1/2020 | Song | G06N 3/0454 |
| 2020/0089247 | A1* | 3/2020 | Shkurti | G06N 3/006 |
| 2020/0294414 | A1* | 9/2020 | Sharma | G06F 3/04847 |
| 2021/0001808 | A1* | 1/2021 | Yamaguchi | B60R 25/305 |

OTHER PUBLICATIONS

Brockmeyer et al., "A Flexible, Extensible Simulation Environment for Testing Real-Time Specifications," IEEE Transactions on Computers, col. 49, No. 11, Nov. 2000, pp. 1184-1201. (Year: 2000).*

Diewald et al., "Gamified Training for Vehicular User Interfaces—Effects on Drivers' Behavior," 2014 International Conference on Connected Vehicles and Expo, pp. 250-257. (Year: 2014).*

U.S. Appl. No. 16/939, 175, filed Jul. 27, 2020. Published as US 2021/0041894.

* cited by examiner

VEHICLE REMOTE INSTRUCTION TRAINING DEVICE

INCORPORATION BY REFERENCE

The disclosure of Japanese Patent Application No. 2019-147881 filed on Aug. 9, 2019 including the specification, drawings and abstract is incorporated herein by reference in its entirety.

BACKGROUND

1. Technical Field

The present disclosure relates to a vehicle remote instruction training device.

2. Description of Related Art

Japanese Patent Application Publication No. 2018-77649 has conventionally been known as a technical literature regarding remote control of a vehicle. The literature discloses a device that performs remote control of a vehicle such that the amount of steering of a steering wheel steered by a remote operator is transmitted to the vehicle, and a steering system of the vehicle is steered in accordance with the amount of steering by the remote operator.

SUMMARY

Now, a system is considered in which a remote commander inputs a remote instruction, such as advance and stop, depending on the situation of an autonomous vehicle, and the autonomous vehicle travels autonomously in response to the remote instruction. Since the remote instruction is an operation completely different from remote operation that is close to driving operation of the vehicle, it is necessary to appropriately train and evaluate a remote commander for the remote commander to issue an appropriate instruction. When the remote commander is evaluated under a completely different environment from the case of issuing a remote instruction to an actual vehicle, it may be difficult to correctly evaluate the skill of issuing the remote instruction to the actual vehicle, and therefore there is room for an improvement.

A vehicle remote instruction training device according to one aspect of the present disclosure is a vehicle remote instruction training device that trains a remote commander who issues a remote instruction to an actual autonomous vehicle. The vehicle remote instruction training device includes: a commander interface; a virtual situation display unit; a remote instruction input recognition unit; and an evaluation unit. The commander interface includes an information output unit configured to show the situation of the actual autonomous vehicle to the remote commander and an instruction input unit for the remote commander to input the remote instruction to the actual autonomous vehicle. The virtual situation display unit is configured to show through the information output unit a virtual situation with time variation to the remote commander, the virtual situation being a situation of a virtual vehicle that is a virtual autonomous vehicle, the remote commander being a trainee. The remote instruction input recognition unit is configured to recognize an input of the remote instruction input into the instruction input unit by the remote commander. The evaluation unit is configured to evaluate the remote commander based on timing at which the remote commander issues the remote instruction with respect to the virtual situation of the virtual vehicle or on the content of the remote instruction.

The vehicle remote instruction training device can show the virtual situation of the virtual vehicle to the remote commander, and evaluate the remote commander based on the timing at which the remote commander has issued the remote instruction with respect to the virtual situation. Accordingly, it is possible to evaluate whether the timing at which the remote commander has issued the remote instruction is appropriate or inappropriate. Hence, it is possible to appropriately perform remote instruction training for the remote commander. The vehicle remote instruction training device uses the commander interface, used for issuing the remote instruction to the actual autonomous vehicle, to show the virtual situation to the remote commander and to recognize an input of the remote instruction by the remote commander. Accordingly, as compared with the case where the remote instruction in the virtual situation is evaluated under completely different environments from the case of issuing the remote instruction to the actual autonomous vehicle, it is possible to evaluate the remote commander in the state closer to the case of issuing the remote instruction to the actual autonomous vehicle.

In the vehicle remote instruction training device, when a plurality of monitor periods for issuing the remote instruction to the actual autonomous vehicle are allocated to the remote commander, the virtual situation display unit may be configured to show the virtual situation to the remote commander through the information output unit in an interval of the monitor periods. The vehicle remote instruction training device evaluates the remote instruction in the virtual situation in the interval of the monitor period for monitoring the actual autonomous vehicle. Accordingly, as compared with the case where the remote instruction in the virtual situation is evaluated on different dates, separately from the monitor periods for monitoring the actual autonomous vehicle, it can be expected that the remote commander can be evaluated in the same state as in monitoring the actual autonomous vehicle. Therefore, more appropriate evaluation of the remote commander can be achieved.

In the vehicle remote instruction training device, the remote commander may be evaluated, based on the situation of the virtual vehicle during a remote instruction behavior period when the virtual vehicle behaves in response to the remote instruction, or on the situation of the virtual vehicle in a remote instruction behavior section where the virtual vehicle behaves in response to the remote instruction. The vehicle remote instruction training device can evaluate the remote commander based on the situation of the virtual vehicle during the remote instruction behavior period when the virtual vehicle behaves in response to the remote instruction or in the remote instruction behavior section where the virtual vehicle behaves in response to the remote instruction, as well as on the timing of the remote instruction. Therefore, it is possible to evaluate that the remote commander has issued the remote instruction in consideration of the situation of the virtual vehicle after issuance of the remote instruction.

In the vehicle remote instruction training device, when the virtual situation is shown as a situation where the virtual vehicle enters a non-signal intersection with a priority road from a non-priority road, the evaluation unit may evaluate the remote commander based on the timing of a deceleration instruction or a stop instruction by the remote commander and on the timing of an advance instruction by the remote commander. With the vehicle remote instruction training device, when the virtual situation is shown as a situation where the virtual vehicle enters a non-signal intersection with a priority road from a non-priority road, the evaluation unit evaluates the remote commander based on the timing of a deceleration instruction or a stop instruction by the remote commander and on the timing of an advance instruction by the remote commander. Therefore, it is possible to evaluate the remote commander based on a combination of the content and the timing of the remote instruction corresponding to the virtual situation.

In the vehicle remote instruction training device, when the virtual situation is shown as a situation where the virtual vehicle enters a non-signal intersection with a priority road from a non-priority road and where there is another vehicle that travels on the priority road toward the non-signal intersection, the evaluation unit may evaluate the remote commander based on a possibility of collision between the virtual vehicle and the other vehicle during an intersection entry period that is the remote instruction behavior period in response to the advance instruction of the remote commander. With the vehicle remote instruction training device, when the virtual situation is shown as a situation where the virtual vehicle enters a non-signal intersection with a priority road from a non-priority road and where there is another vehicle that travels on the priority road toward the non-signal intersection, the remote commander is evaluated based on the possibility of collision between the virtual vehicle and another vehicle during the intersection entry period in response to the advance instruction of the remote commander. Therefore, it is possible to appropriately evaluate whether the remote commander has taken into consideration the relationship between the virtual vehicle and the other vehicle after issuance of the advance instruction.

In the vehicle remote instruction training device, when the virtual situation is shown as a situation where the virtual vehicle changes lanes, the evaluation unit may evaluate the remote commander based on timing of a lane change instruction of the remote commander, a lane change section used as the remote instruction behavior section in response to the lane change instruction, and a predetermined lane change permission section on a road where the virtual vehicle travels. With the vehicle remote instruction training device, when the virtual situation is shown as the situation where the virtual vehicle changes lanes, the remote commander is evaluated based on the timing of the lane change instruction, the lane change section, and the lane change permission section. Therefore, it is possible to appropriately evaluate whether the remote commander has taken into consideration whether the virtual vehicle after issuance of the lane change instruction could change lanes in the lane change permission section.

The vehicle remote instruction training device according to one aspect of the present disclosure can appropriately perform remote instruction training for the remote commander.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described hereinbelow with reference to the drawings.

Figure 1:
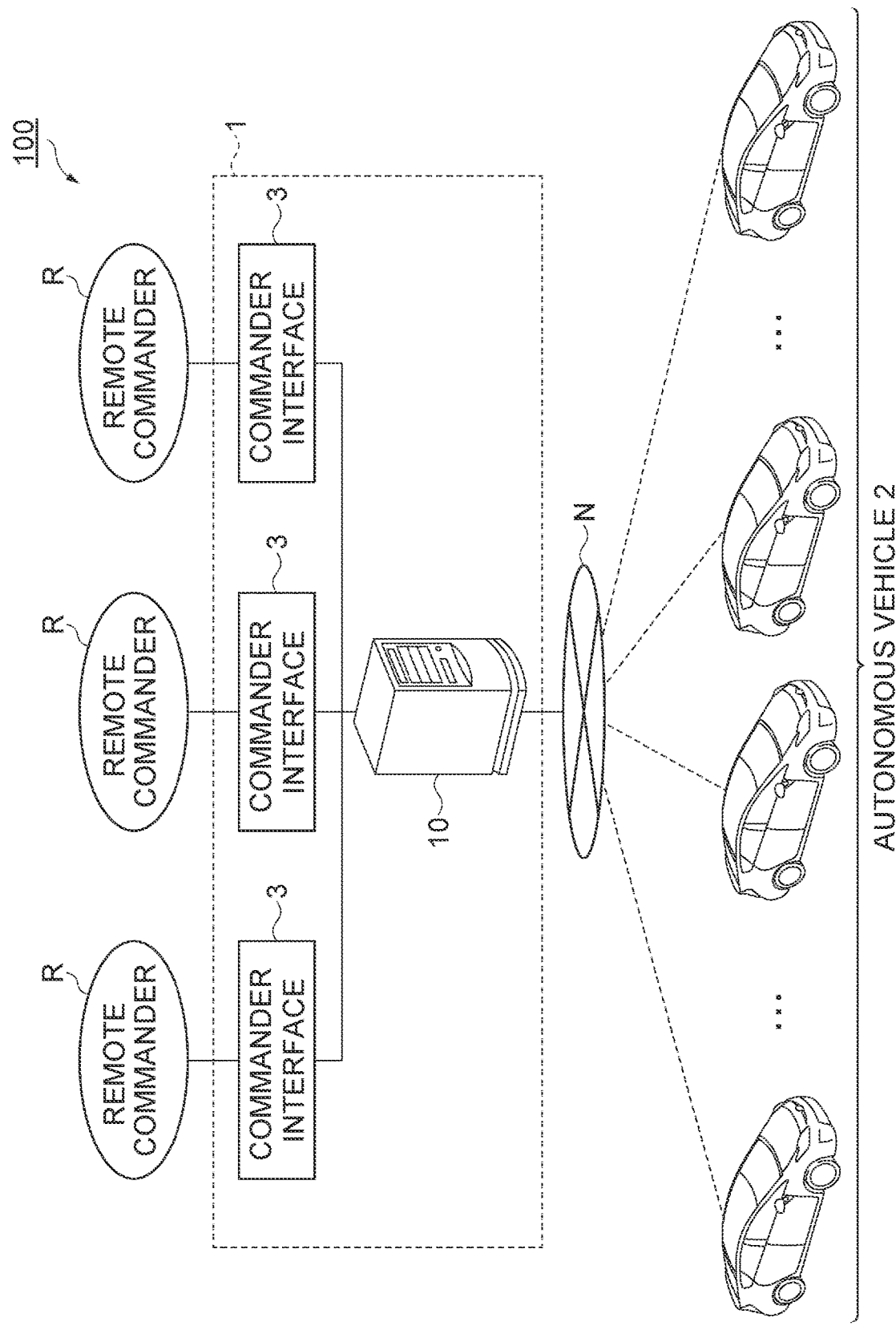
FIG. 1 is a block diagram showing an example of a vehicle remote instruction system including a vehicle remote instruction training device according to one embodiment.

FIG. 1 is a block diagram showing an example of a vehicle remote instruction system including a vehicle remote instruction training device according to one embodiment. A vehicle remote instruction system 100 shown in FIG. 1 is a system in which remote commanders R issue a remote instruction to actual autonomous vehicles 2. The remote instruction is an instruction relating to the travel of the autonomous vehicle 2 by the remote commander R.

The remote instruction includes an instruction to advance the autonomous vehicle 2, and an instruction to stop the autonomous vehicle 2. The remote instruction may include an instruction to change lanes of the autonomous vehicle 2. The remote instruction may also include an instruction for offset avoidance of an obstacle ahead of the autonomous vehicle 2, an instruction to overtake a leading vehicle, and an instruction for urgent evacuation. In addition, the remote instruction may include an instruction to the autonomous vehicle 2 relating to getting on and off of occupants (for example, an instruction for automatic opening and closing of a door, and an instruction to start voice guidance for getting off the vehicle).

The number of the remote commanders R is not limited in the vehicle remote instruction system 100. The number of the remote commanders R may be one or two, or may be dozens. The number of the autonomous vehicles 2 that can communicate with the vehicle remote instruction system 100 is not particularly limited, either. The vehicle remote instruction system 100 may be configured such that the two or more remote commanders R issue the remote instruction to one autonomous vehicle 2 in rotation, and may also be configured such that the one remote commander R issues the remote instruction to the two or more autonomous vehicles 2.

The autonomous vehicle 2 generates a trajectory along a target route based on, for example, a preset target route, a map location of the autonomous vehicle 2, map information, a situation surrounding the autonomous vehicle 2 obtained from the detection result of external sensors (a camera, and a radar sensor) of the autonomous vehicle 2, and a vehicle state obtained from the detection result of internal sensors (a vehicle speed sensor, and a yaw rate sensor). The target route may manually be set by an occupant of the autonomous vehicle 2, or may automatically be set by a well-known navigation system or autonomous driving system. The trajectory includes a vehicle speed plan corresponding to the location on the target route, and a steering plan (corresponding to the route on lanes) corresponding to the location on the target route. The autonomous vehicle 2 can drive autonomously along the trajectory. The method for generating the trajectory and the content of the trajectory are not limited to those described above. Well-known generation methods, or the like, can be adopted.

The autonomous vehicle 2 requests a remote instruction of the remote commander R, when the autonomous vehicle 2 is put in any predetermined remote instruction target situations, such as the situation of turning right at an intersection. The remote commander R inputs a remote instruction in response to the request from the autonomous vehicle 2. The autonomous vehicle 2 generates a trajectory corresponding to the remote instruction in advance, and autonomously drives along the trajectory corresponding to the received remote instruction. The autonomous vehicle 2 does not necessarily need to make a remote instruction request. Instead, the remote commander R may determine to transmit a remote instruction. In response to the input of a remote instruction, the autonomous vehicle 2 may start to generate a trajectory corresponding to the remote instruction.

As illustrated in FIG. 1, the vehicle remote instruction system 100 includes a vehicle remote instruction training device 1. The vehicle remote instruction training device 1 is a device for training the remote commander (trainee) who issues a remote instruction to the actual autonomous vehicle 2. The vehicle remote instruction training device 1 shows a virtual situation with time variation to the remote commander R, the virtual situation including the travel state of a virtual vehicle that is a virtual autonomous vehicle, and external environments of the virtual vehicle. As described later, the vehicle remote instruction training device 1 trains the remote commander R by using the same device (commander interface 3) as the device used for issuing a remote instruction to the actual autonomous vehicle 2.

The vehicle remote instruction training device 1 evaluates the remote commander R based on the timing at which the remote commander R issues a remote instruction with respect to the virtual situation of the virtual vehicle. The virtual vehicle may model after an autonomous vehicle that is actually present, and the virtual situation may model after the situations that the actually present autonomous vehicles encountered in the past. The virtual situation will be described in detail later.

The vehicle remote instruction training device 1 in the present embodiment also functions as a remote instruction device that allows the remote commander R to transmit an actual remote instruction to the autonomous vehicle 2. The vehicle remote instruction training device 1 may be provided as a component of the remote instruction device.

Configuration of Vehicle Remote Instruction Training Device

Figure 2:
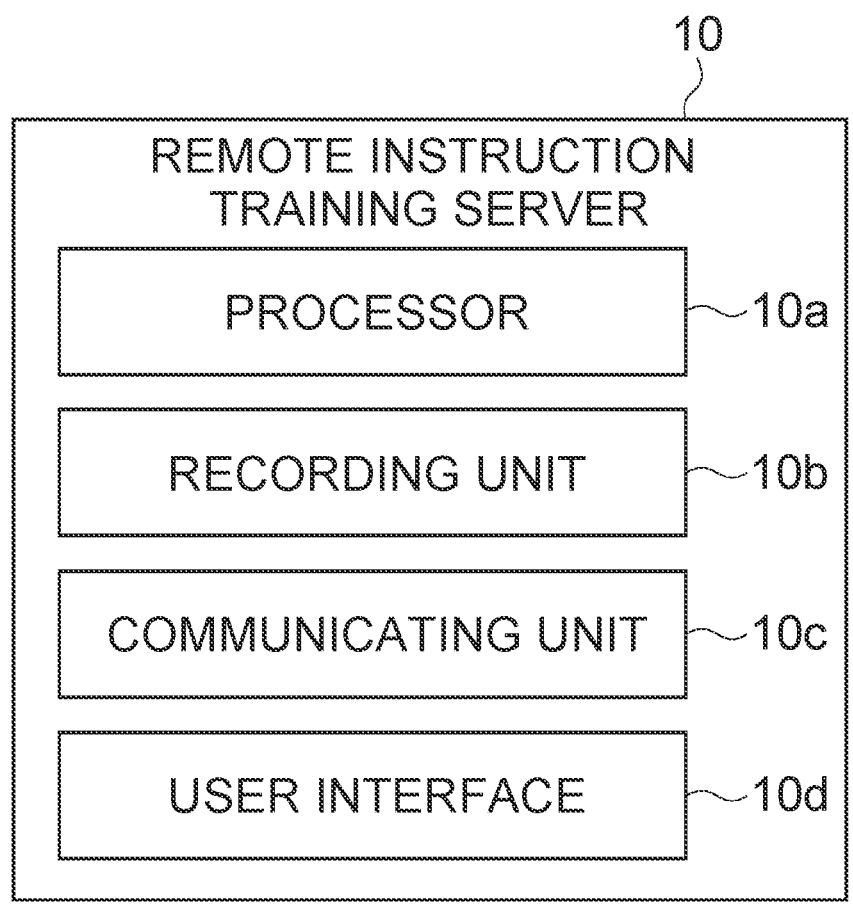
FIG. 2 shows an example of the hardware configuration of a remote instruction training server.

As shown in FIG. 1, the vehicle remote instruction training device 1 has a remote instruction training server 10. First, the hardware configuration of the remote instruction training server 10 will be described. FIG. 2 is a block diagram showing an example of the hardware configuration of the remote instruction training server 10. As shown in FIG. 2, the remote instruction training server 10 is configured as a general computer including a processor 10$a$, a recording unit 10$b$, a communication unit 10$c$, and a user interface 10$d$. A user in this case refers to the user (administrator, etc.) of the remote instruction training server 10.

The processor 10$a$ operates various operating systems to control the remote instruction training server 10. The processor 10$a$ is a computing unit, such as a CPU, including a controller, an arithmetic device, and a register. The processor 10$a$ controls the recording unit 10$b$, the communication unit 10$c$, and user interface 10$d$. The recording unit 10$b$ is configured by including at least one of a memory and a storage. The memory is a record medium, such as a ROM and a RAM. The storage is a recording medium, such as a HDD.

The communication unit 10$c$ is a communication device for communication through a network N. As the communication unit 10$c$, devices such as a network device, a network controller, and a network card, can be used. The user interface 10$d$ is an input-output unit for users, such as an administrator, of the remote instruction training server 10. The user interface 10$d$ includes an output device, such as a display and a speaker, and an input device, such as a touch panel. The remote instruction training server 10 may be provided in other than facilities. The remote instruction training server 10 may be mounted on a mobile object, such as a vehicle.

Figure 3:
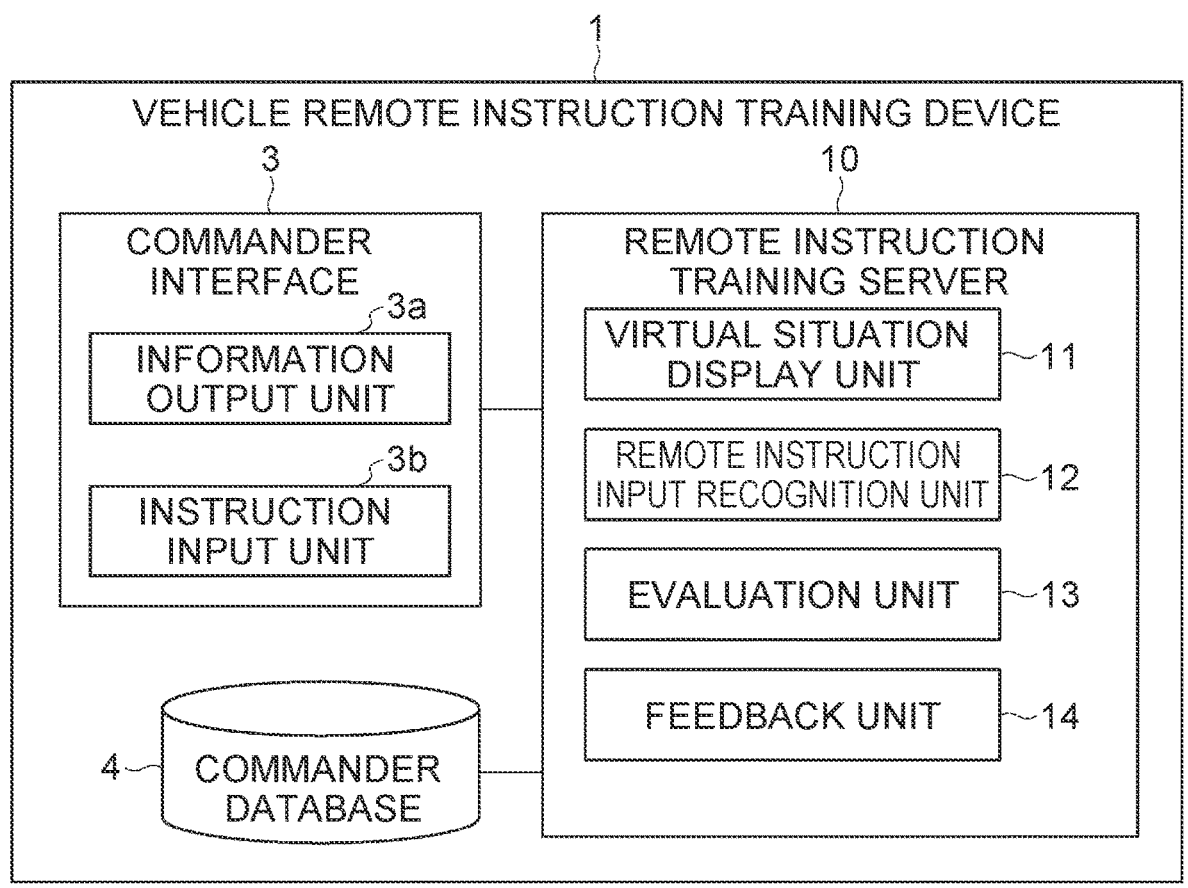
FIG. 3 is a block diagram showing an example of the vehicle remote instruction training device.

FIG. 3 is a block diagram showing an example of the vehicle remote instruction training device 1. As shown in FIG. 3, the remote instruction training server 10 for the vehicle remote instruction training device 1 is connected with the commander interface 3 and a commander database 4.

The commander interface 3 is an input output unit of the vehicle remote instruction training device 1 for the remote commander R. The commander interface 3 is used for the remote commander R to issue a remote instruction to the actual autonomous vehicle 2. The commander interface 3 has an information output unit 3$a$ and an instruction input unit 3$b$.

The information output unit 3$a$ is a device that outputs to the remote commander R the information used for the remote instruction of the autonomous vehicle 2. The information output unit 3$a$ includes a display that outputs an image, and a speaker that outputs sound.

In one example, the display displays an image in front of the autonomous vehicle 2 (an image of a front scene) that is imaged with a camera of the autonomous vehicle 2. The display may display an image in an advance direction of the autonomous vehicle 2 (a rear image when the vehicle reverses). The display may have a plurality of display screens to display both or one of a side image and a rear image of the autonomous vehicle 2.

When displaying a virtual situation, the display displays a front image (image of a front scene) of a virtual vehicle in one example. The display may display an image in an advance direction of the virtual vehicle (a rear image when the vehicle reverses). The display may have a plurality of display screens to display both or one of a side image and a rear image of the virtual vehicle. The display may be any display as long as the display is configured such that visual information can be provided to the remote commander R. The display may be a wearable device that is worn to cover the eyes of the remote commander R.

For example, the speaker is a head set speaker that is worn on the head of the remote commander R. The speaker notifies the situation of the autonomous vehicle 2 or the virtual situation of the virtual vehicle to the remote commander R by voice (for example, voice such as "turn right at the intersection). The speaker may be other than the head set, such as a stationary speaker.

The information output unit 3a may provide the remote commander R with information by vibration. The information output unit 3a may have a vibration actuator provided in a seat of the remote commander R, for example. The information output unit 3a may warn the remote commander R about another vehicle approaching the virtual vehicle, or the like, by vibration. The information output unit 3a has vibration actuators in both right and left sides of the seat, and may vibrate the vibration actuator at a position according to the approaching direction of the other vehicle, or the like. The information output unit 3a may have a wearable vibration actuator to be worn on the body of the remote commander R. The information output unit 3a can provide the remote commander R with information by vibrating the vibration actuators, worn on respective positions of the body, according to the approaching direction of another vehicle, or the like.

Figure 4:
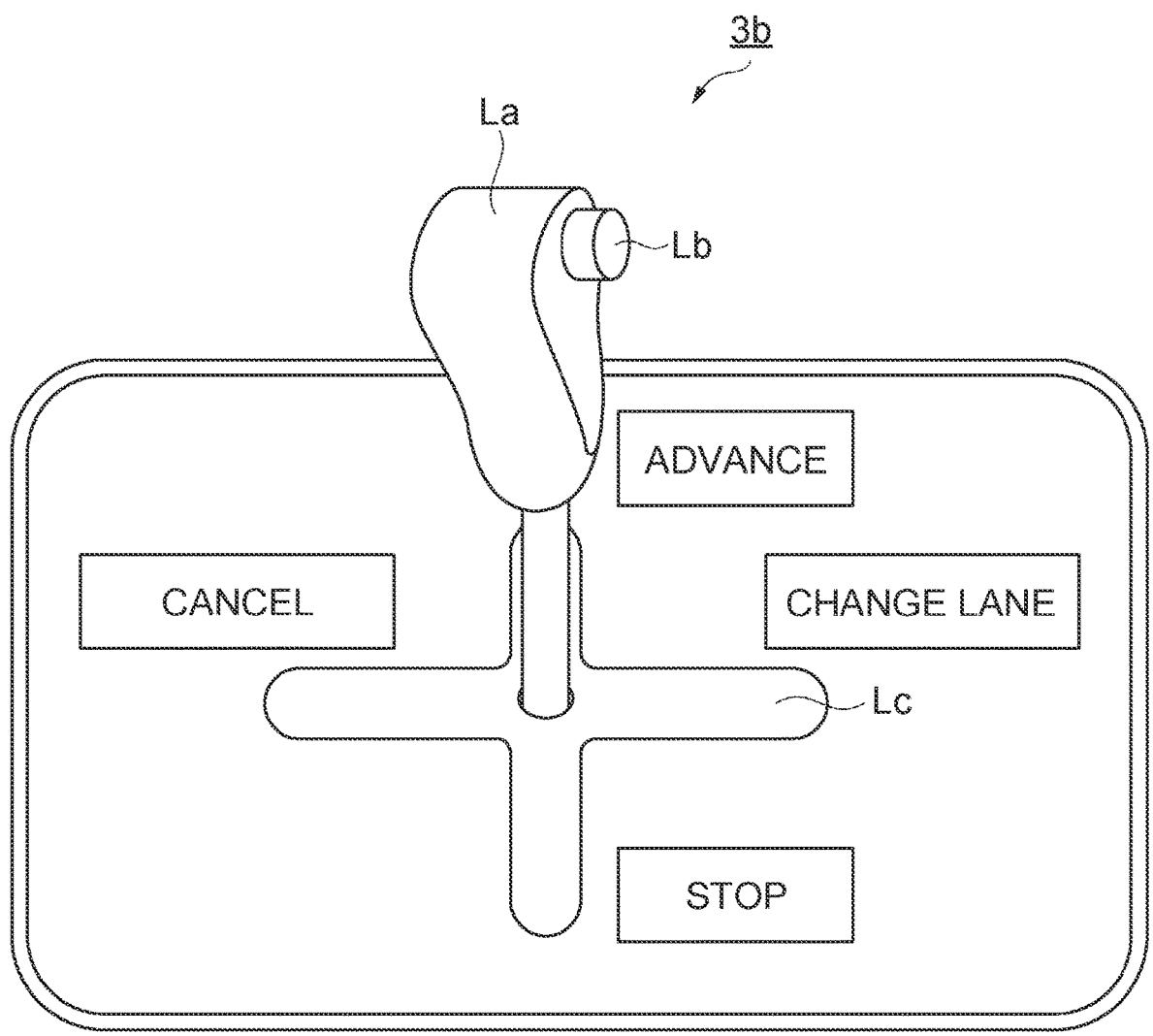
FIG. 4 shows an example of an instruction input unit.

The instruction input unit 3b is a device that receives a remote instruction that is input by the remote commander R. The instruction input unit 3b is also used for inputting a remote instruction to the actual autonomous vehicle 2. Here, FIG. 4 shows an example of the instruction input unit 3b. The instruction input unit 3b shown in FIG. 4 adopts a gate-type lever structure. In FIG. 4, a Lever La, a monitoring start button Lb, and a cross groove Lc are shown.

The lever La is a lever for the remote commander R to operate. For example, the lever La has an upper-end grip portion, and a shaft portion extending toward the cross groove (cross joint gate) Lc from the grip portion. On the side surface of the grip portion of the lever La, a monitoring start button Lb is provided. The position of the monitoring start button Lb is not particularly limited. The monitoring start button Lb may be provided on a left side surface or may be on a right side surface of the grip portion. The monitoring start button Lb may be provided on the same surface as the cross groove Lc.

The monitoring start button Lb is a button pressed when the remote commander R starts monitoring the situation of the virtual vehicle. The vehicle remote instruction training device 1 may recognize that the remote commander R has started monitoring, when the monitoring start button Lb is pressed. The monitoring start button Lb functions also as a lock release button of the lever La. Specifically, the lever La is unlocked and becomes movable, while the monitoring start button Lb is pressed or for a fixed time after the monitoring start button Lb is pressed. The instruction input unit 3b shown in FIG. 4 adopts a two-step input method. There is not necessarily provided the monitoring start button Lb that corresponds to an input of a first step. The instruction input unit 3b may adopt a single-step input method.

The cross groove Lc is a groove in which the shaft portion of lever La is disposed. According to the operation by the remote commander R, the lever La moves within the groove. In the instruction input unit 3b shown in FIG. 4, a remote instruction is input by switching the position of the lever La along the cross groove Lc. As shown in FIG. 4, moving the lever La upward in the cross groove Lc may be defined as an input operation "advance, moving the lever La downward may be defined as an input operation "stop", and moving the lever La rightward may be defined as an input operation "change lane", and moving the lever La leftward may be defined as an input operation "cancel".

For example, the remote commander R moves the lever La upward while pressing the monitoring start button Lb so as to input the operation "advance" to the virtual vehicle. For example, the remote commander R moves the lever La downward while pressing the monitoring start button Lb so as to input the operation "stop" to the virtual vehicle. To cancel the remote instruction issued immediately before, the remote commander R moves the lever La leftward while pressing the monitoring start button Lb, and the operation of "cancel" is input.

The display of "advance" or the like in the cross groove Lc may be a changeable digital display. The display of "advance", "change lane", or the like may be changed depending on the situation of the virtual vehicle. For example, the display of "change lane" may be changed to "overtake" depending on the situation. In this case, the remote instruction of overtake can be issued to the virtual vehicle by moving the lever La rightward.

The remote instruction "stop" may be changed to "suspend determination." The remote instruction "stop" causes the virtual vehicle to stop regardless of the position of the virtual vehicle, whereas the remote instruction "suspend determination" causes the virtual vehicle to continue autonomous driving until reaching the position where the remote instruction becomes essential (for example, a temporary stop line before a traffic signal). The instruction input unit 3b may be configured such that "stop" and "suspend determination" can be input in a distinguishable manner. When the monitoring start button Lb is present, continuous pressing of the monitoring start button Lb by the remote commander R may be defined as the instruction "suspend determination".

Instead of the cross groove, a straight groove that enables selection of two remote instruction inputs, including advance and stop (or suspend), may be adopted, or a stepped groove, typically adopted as a shift lever of the vehicle or the like, may be selected as the instruction input unit 3b. In addition, a button for emergency evacuation may be provided independently. The emergency evacuation may be provided as one of the remote instructions selectable by operation of the lever La.

In addition, various input methods may be adopted for the instruction input unit 3b. For the instruction input unit 3b, buttons and a touch panel may be adopted, or various switches, such as toggle switches and rocker switches, may be adopted. For the instruction input unit 3b, a keyboard may be adopted, and a speech input system may be adopted. The instruction input unit 3b may be provided with button covers to prevent misoperation. To prevent misoperation, the instruction input unit 3b may be configured such that both a button and a switch may be used, both a button and a handle bar may be used, or both a pedal and a lever may be used. The instruction input unit 3b may be configured such that the remote instruction can be input by combining two or more operations out of a lever operation, a button operation, a touch panel operation, a pedal operation, and a voice input.

In the case of virtual buttons as in the touch panel, the positions of the buttons to be displayed may be flexibly so as to restrain the remote commander R from reflectively operating the buttons without sufficiently recognizing the situation of the autonomous vehicle 2. The content (such as advance and stop) of the remote instruction input by the remote commander R may be notified through voice or image display, or a combination of both. Notification may be made by text display instead of image display, or notification to the remote commander R may be made by color change.

For the instruction input unit 3b, an enable button may be adopted. The enable button in this case refers to a button configured such that a signal is not transmitted unless the button is pressed with a pressing amount within a preset range. When the button is pressed too lightly or too deeply, the signal is not transmitted. For the instruction input unit 3b, a two-stage switch that can transmit information different between when the switch is lightly pressed and when the switch is deeply pressed may be adopted. For the instruction input unit 3b, a dial (for example, a rotary switch) that enables selection of the content of the remote instruction by turning a disc-like turntable may also be adopted. The dial is provided with a plurality of dents, and the respective dents correspond to the remote instruction contents, such as "advance" and "stop."

The commander database 4 is a database that stores information on the remote commanders R. The remote commander information include personal identification information on the remote commanders R and information relating to evaluations of the remote commanders R. The information relating to evaluations of the remote commanders R is information on the evaluations of the remote commanders R evaluated by the vehicle remote instruction training device 1.

Next, the functional configuration of the remote instruction training server 10 will be described. As shown in FIG. 3, the remote instruction training server 10 includes a virtual situation display unit 11, a remote instruction input recognition unit 12, an evaluation unit 13, and a feedback unit 14.

The virtual situation display unit 11 shows to the remote commander R who is a trainee, a virtual situation with time variation, the virtual situation being a situation of a virtual vehicle. The virtual situation display unit 11 shows the virtual situation to the remote commander R through the information output unit 3a. The virtual situation display unit 11 may provide the remote commander R with the information on the virtual situation by sound.

The virtual situation includes, for example, a travel state of the virtual vehicle, and an external environment of the virtual vehicle. The travel state of the virtual vehicle includes such travel states as a vehicle speed, an acceleration, and a yaw rate (steering angle) of the virtual vehicle. The external environment of the virtual vehicle includes the environment of a road on which the virtual vehicle travels, and the situation of an obstacle around the virtual vehicle. Examples of the obstacle include fixed obstacles, such as buildings, electric poles, and guardrails, and moving obstacles, such as other vehicles and pedestrians.

The virtual situation display unit 11 may display the virtual situation in any method. For example, the virtual situation display unit 11 may display on a display at least one of a vehicle speed, an acceleration, a yaw rate, and a steering angle of the virtual vehicle as a numeric value or a meter. The virtual situation display unit 11 may display on the display the information displayed on an instrument panel of the virtual vehicle. The virtual situation display unit 11 may display the virtual situation by showing on the display an imaged image in front of the virtual vehicle, or may display the virtual situation by showing an image of the virtual vehicle in plan view, or an image of the virtual vehicle looked down from the above. The virtual situation display unit 11 may display map information including the position of the virtual vehicle on the map. The virtual situation display unit 11 may display a likelihood of traffic signal recognition with respect to a traffic signal included in the virtual situation (likelihood of recognizing a lighting state of the traffic signal), and may display a predicted trajectory of another vehicle included in the virtual situation.

The virtual situation display unit 11 may show to the remote commander R the same information as the case of issuing a remote instruction to an actual autonomous vehicle 2. In this case, the virtual situation display unit 11 does not need to indicate to the remote commander R that this is a training mode. The virtual situation display unit 11 may display the virtual situation as training in the interval of the periods when the remote commander R takes charge of remote instruction to the actual autonomous vehicle 2.

Specifically, the vehicle remote instruction system 100 allocates to the remote commander R a monitor period for remote instruction to the actual autonomous vehicle 2. The vehicle remote instruction system 100 predicts the time when the autonomous vehicle 2 requests the remote instruction, and allocates the monitor period based on, for example, a target route along which the autonomous vehicle 2 travels autonomously, the current position of the autonomous vehicle 2, and map information. The remote commander R may take charge of the remote instruction to two or more autonomous vehicles 2.

In this case, the virtual situation display unit 11 shows to the remote commander R the virtual situation through the information output unit 3a in the interval of the monitor periods allocated to the remote commander R. The virtual situation display unit 11 shows the virtual situation to the remote commander R in the interval of the monitor period, when the interval of the allocated monitor periods is equal to or greater than an evaluation start threshold. The evaluation start threshold is a threshold of a preset value. The virtual situation display unit 11 may be configured to show the virtual situation a predetermined number of times in a fixed period. The fixed period is not particularly limited. The fixed period may be one day, or may be one week or one month. The interval of the monitor periods does not include the interval that is over two days.

The remote instruction input recognition unit 12 recognizes an input of the remote instruction to the instruction input unit 3b by the remote commander R. The remote instruction input recognition unit 12 recognizes the content of the remote instruction and the timing (input timing) of the remote instruction input by the remote commander R, based on the operation of the instruction input unit 3b performed by the remote commander R.

The evaluation unit 13 evaluates the remote commander R based on the timing at which the remote commander R issues the remote instruction with respect to the virtual situation of the virtual vehicle. When evaluating the remote commander R, the evaluation unit 13 stores the evaluation result in the commander database 4.

Figure 5A:
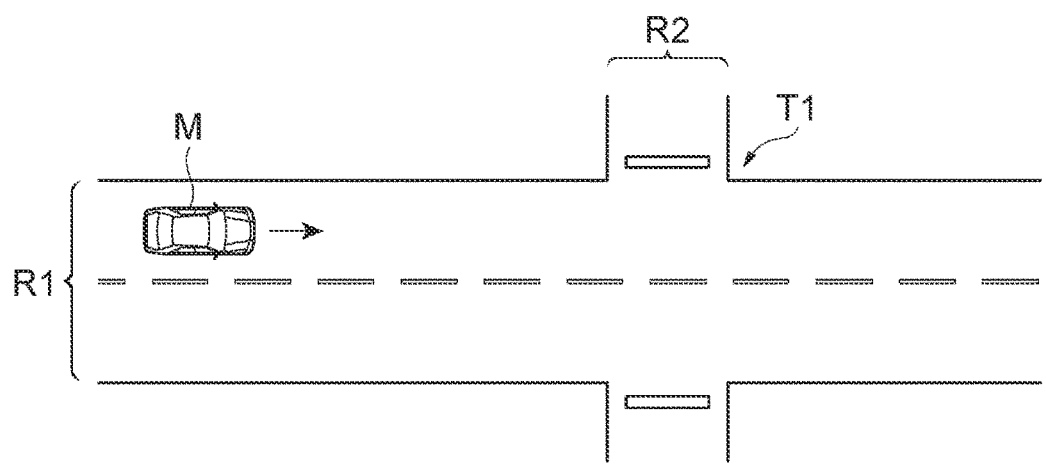
FIG. 5A is a plan view for describing the situation where a virtual vehicle enters an intersection with a non-priority road from a priority road.

Here, FIG. 5A is a plan view for describing the situation where the virtual vehicle enters an intersection with a non-priority road from a priority road. FIG. 5A shows a virtual vehicle M, a priority road R1, a non-priority road R2, and an intersection T1. For example, the virtual vehicle M travels at a maximum legal speed of the priority road R1. In the situation shown in FIG. 5A, it is assumed that the remote commander R issues a deceleration instruction in consideration of another vehicle running out from the non-priority road R2, for example.

Figure 5B:
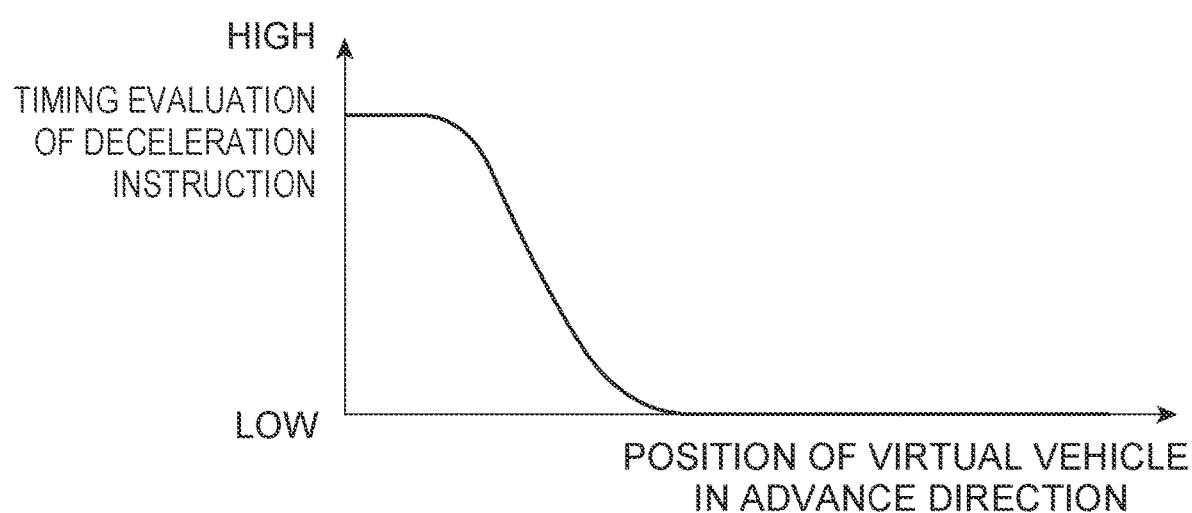
FIG. 5B is a graph showing an example of the relationship between evaluation of the timing of a deceleration instruction and the position of the virtual vehicle in an advance direction.

FIG. 5B is a graph showing an example of the relationship between evaluation of the timing of a deceleration instruction and the position of the virtual vehicle in an advance direction. A vertical axis represents evaluation of the timing of the deceleration instruction, and a horizontal axis represents the position of the virtual vehicle in the advance direction. As shown in FIG. 5B, when the remote commander R inputs a deceleration instruction in the position where the virtual vehicle M is sufficiently distanced from the intersection T1, the evaluation unit 13 gives a higher evaluation to the timing of the deceleration instruction than when the remote commander R inputs the deceleration instruction after the virtual vehicle M approaches the intersection T1.

The horizontal axis may be a distance until the virtual vehicle M reaches the intersection T1, or may be remaining time until the virtual vehicle M reaches the intersection T1 at a current vehicle speed. In this case, the distance or remaining time beyond the intersection T1 may be expressed as a negative value. Alternatively, the horizontal axis may be a travel distance of the virtual vehicle or may be lapsed time from the start of the virtual situation.

Figure 6A:
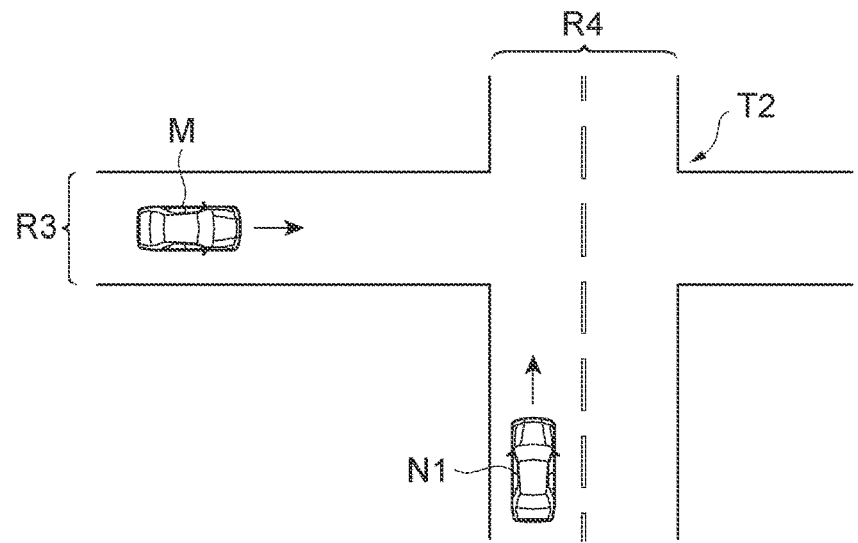
FIG. 6A is a plan view for describing the situation where the virtual vehicle enters an intersection with a priority road from a non-priority road.

FIG. 6A is a plan view for describing the situation where the virtual vehicle M enters an intersection with a priority road from a non-priority road. FIG. 6A shows a non-priority road R3, a priority road R4, an intersection T2, and another vehicle N1 traveling on the priority road R4 toward the intersection T2. In the situation shown in FIG. 6A, it is assumed that the remote commander R issues different instructions in two stages: a deceleration instruction or a stop instruction before entering the intersection T2; and an advance instruction of toward the intersection T2. When the virtual vehicle M has a function of automatically stopping at a temporary stop line, and the temporary stop line is present before the intersection T2, the stop instruction is not necessary.

Figure 6B:
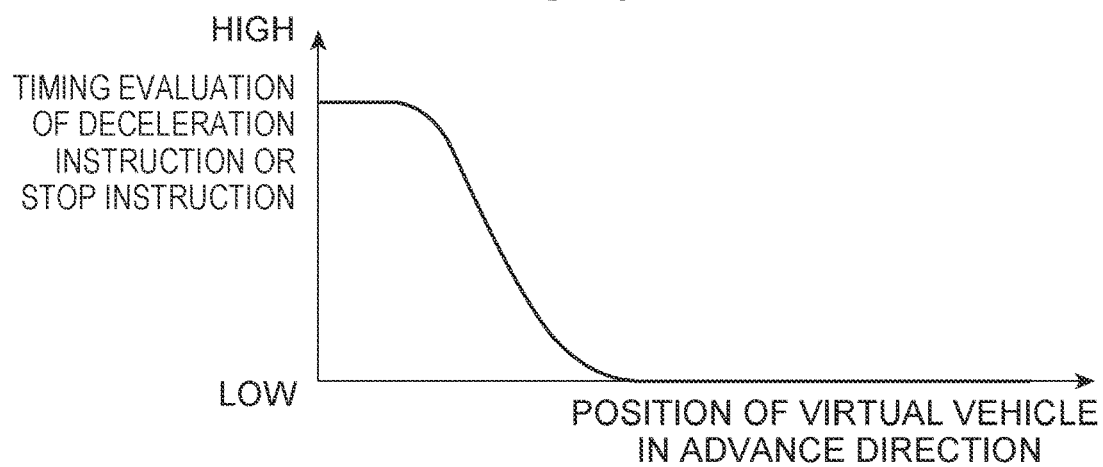
FIG. 6B is a graph showing an example of the relationship between evaluation of the timing of a deceleration instruction or a stop instruction, and the position of the virtual vehicle in the advance direction.

FIG. 6B is a graph showing an example of the relationship between evaluation of the timing of the deceleration instruction or the stop instruction, and the position of the virtual vehicle M in the advance direction. A vertical axis represents evaluation of the timing of the deceleration instruction or the stop instruction, and a horizontal axis represents the position of the virtual vehicle in the advance direction.

As shown in FIG. 6B, when the remote commander R inputs a deceleration instruction at the position where the virtual vehicle M is sufficiently away from the intersection T2, the evaluation unit 13 gives a higher evaluation to the timing of the deceleration instruction than when the remote commander R inputs the deceleration instruction after the virtual vehicle M approaches the intersection T2. This applies to the case of the stop instruction. When a plurality of different instructions (for example, the deceleration instruction and the stop instruction) can be input, the same evaluation criteria may be used, or different evaluation criteria may be used for the different instructions. Specifically, in the situation shown in FIG. 6A, the evaluation unit 13 may use the evaluation criteria (evaluation graph) of FIG. 6B in both the case where the remote commander R inputs the deceleration instruction and the case where the remote commander R inputs the stop instruction, or may use different evaluation criteria corresponding to the respective cases.

Figure 6C:
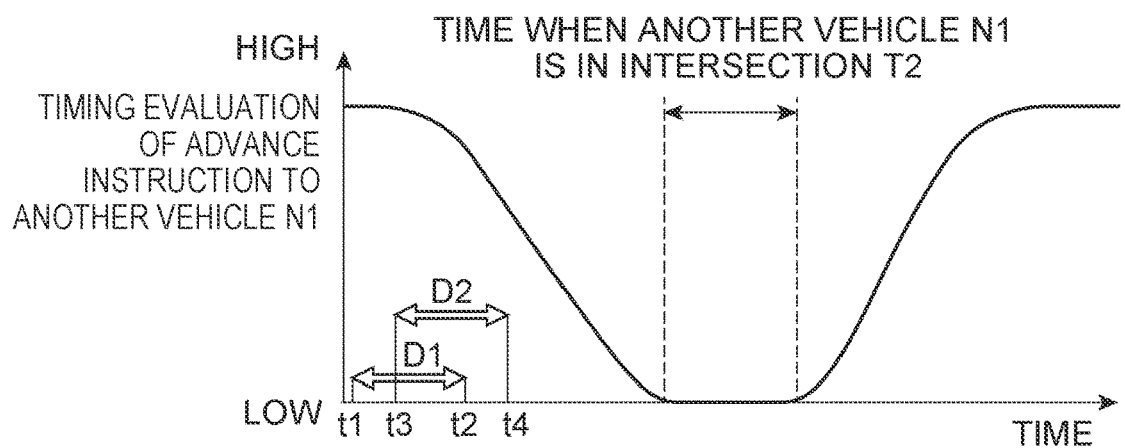
FIG. 6C is a graph showing an example of the relationship between evaluation of the timing of an advance instruction issued with respect to another vehicle and time.

FIG. 6C is a graph showing an example of the relationship between evaluation of the timing of an advance instruction with respect to another vehicle, and time. A vertical axis represents evaluation of the timing of an advance instruction issued with respect to another vehicle N1, and a horizontal axis represents time. As shown in FIG. 6C, the evaluation unit 13 gives the lowest evaluation to the advance instruction, when the remote commander R inputs the advance instruction during the time when the other vehicle N1 is in the intersection T2. The evaluation unit 13 gives a high evaluation to the advance instruction, when the remote commander R inputs the advance instruction at the timing when the other vehicle N1 is at the position away from the intersection T2. The evaluation unit 13 evaluates the timing of the deceleration instruction in consideration of a distance to the intersection or the like, and the timing of the advance instruction in consideration of the other vehicle, respectively.

In evaluation of the timing of the advance instruction with respect to the other vehicle N1, the evaluation unit 13 may use the distance between the virtual vehicle M and the other vehicle N1 instead of time, or may use a time to collision (TTC).

The evaluation unit 13 may evaluate the remote commander R based on the situation of the virtual vehicle M in a remote instruction behavior period in which the virtual vehicle M behaves in response to the remote instruction. The remote instruction behavior period is a period from the start to the end of the behavior of the virtual vehicle M in response to the remote instruction. For example, the remote instruction behavior period may be defined as a period from the start to the end of deceleration of the virtual vehicle M in response to the deceleration instruction. For example, the remote instruction behavior period may be defined as a period after the virtual vehicle M starts to advance toward the intersection T2 in response to the advance instruction of toward the intersection T2 until the virtual vehicle M passes over the intersection T2. The remote instruction behavior period may be defined as a period from the start to the end of lane change of the virtual vehicle M in response to a lane change instruction.

Here, FIG. 6C shows the intersection entry periods D1, D2 that are periods in which the virtual vehicle M enters the intersection T2 in response to the advance instruction by the remote commander R. The intersection entry periods D1, D2 are different in timing of the advance instruction issued by the remote commander R. Since the virtual vehicle M in the intersection entry period D2 is closer to the intersection T2 when starting to enter it, the intersection entry period D2 becomes shorter.

Specifically, the intersection entry period D1 starts at t1 and ends at t2. The intersection entry period D2 starts at t3 and ends at t4. The start time t3 and the end time t4 of the intersection entry period D2 are later than the start time t1 and the end time t2 of the intersection entry period D1. In short, the intersection entry period D2 is later in timing of the advance instruction than the intersection entry period D1.

As shown in FIG. 6C, the start time t1 of the intersection entry period D1 and the start time t3 of the intersection entry period D2 are both included in an area high in evaluation of the timing of the advance instruction. However, the end time t4 of the intersection entry period D2 is within an area that is low in evaluation of the timing of the advance instruction. Under such circumstances, when the period of entering into the intersection T2 in response to the advance instruction by the remote commander R is the intersection entry period D2, the virtual vehicle M approaches closer to the other vehicle N1 than when the period is the intersection entry period D1. Hence, the evaluation unit 13 may give a lower evaluation to the advance instruction by the remote commander R.

In addition, the evaluation unit 13 may evaluate the remote commander R based on a maximum value of the possibility of collision between the virtual vehicle M and another vehicle (for example, another vehicle N1) in the remote instruction behavior period, as the situation of the virtual vehicle M in the remote instruction behavior period in response to the remote instruction. For example, the evaluation unit 13 calculates the time to collision between the virtual vehicle M and another vehicle as a collision possibility. The evaluation unit 13 may replace the time to collision with inter vehicle time. The evaluation unit 13 may calculate the collision possibility from a prescribed arithmetic expression that takes the time to collision or the inter vehicle time as an input value.

When the maximum value of the possibility of collision between the virtual vehicle M and another vehicle in the remote instruction behavior period in response to the remote instruction is equal to or greater than a collision possibility threshold, the evaluation unit 13 gives a lower evaluation to the remote instruction than when the maximum value of the collision possibility is less than the collision possibility threshold. The collision possibility threshold is a threshold of a preset value. The evaluation unit 13 may give a lower evaluation to the remote instruction, as the maximum value of the possibility of collision between the virtual vehicle M and another vehicle in the remote instruction behavior period in response to the remote instruction is larger.

Figure 7A:
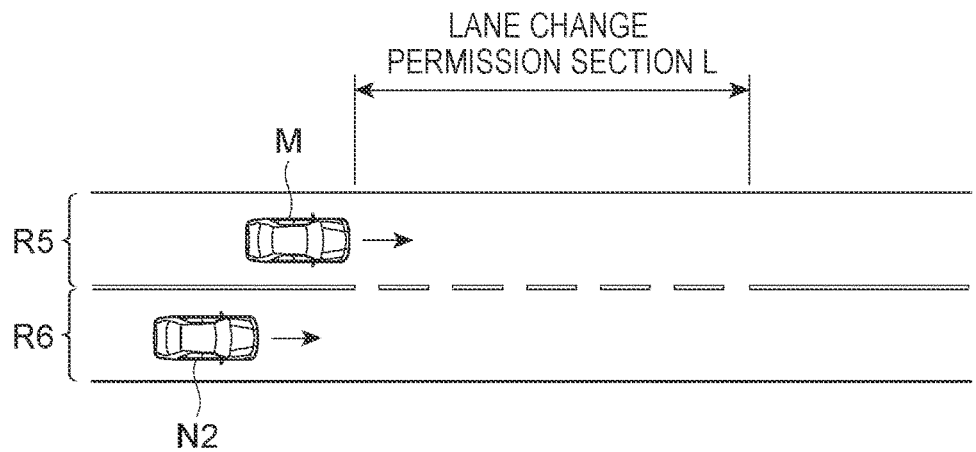
FIG. 7A is a plan view for describing the situation where the virtual vehicle changes lanes.

FIG. 7A is a plan view for describing the situation where the virtual vehicle M changes lanes. FIG. 7A shows a travel lane R5 where the virtual vehicle M travels, an adjacent lane R6 that is a lane change destination, another vehicle N2 traveling on the adjacent lane R6, and a lane change permission section L. The lane change permission section L is a section where the lane change is legally permitted. The other vehicle N2 is traveling on an oblique rear side of the virtual vehicle M, at a speed higher than the speed of the virtual vehicle M.

Figure 7B:
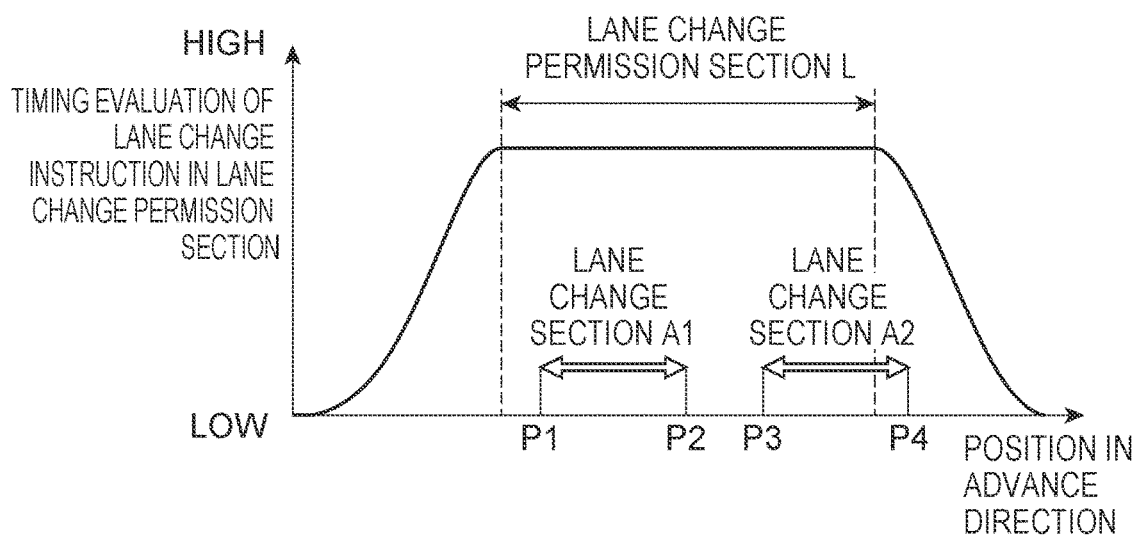
FIG. 7B is a graph showing an example of the relationship between evaluation of the timing of a lane change instruction in a lane change permission section and the position of the virtual vehicle in the advance direction.

FIG. 7B is a graph showing an example of the relationship between evaluation of the timing of the lane change instruction in the lane change permission section L and the position of the virtual vehicle M in the advance direction. A vertical axis represents evaluation of the timing of the lane change instruction in the lane change permission section, and a horizontal axis represents the position of the virtual vehicle in the advance direction. The lane change sections A1, A2 shown in FIG. 7B will be described later.

As shown in FIG. 7B, when a lane change instruction is input at the timing when the virtual vehicle M is located in the lane change permission section L, the evaluation unit 13 gives a higher evaluation to the timing of the lane change instruction input by the remote commander R than when the lane change instruction is input at the timing when the virtual vehicle M is located in other than the lane change permission section L. The evaluation unit 13 gives a lower evaluation, as the position of the virtual vehicle M at the timing of the lane change instruction by the remote commander R is more distanced from the lane change permission section L.

Figure 7C:
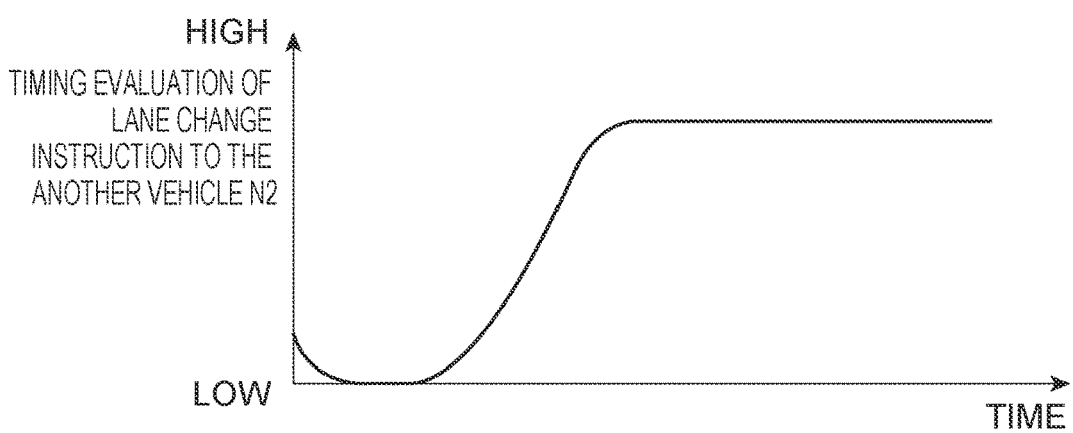
FIG. 7C is a graph showing an example of the relationship between evaluation of the timing of the lane change instruction issued with respect to another vehicle and time.

FIG. 7C is a graph showing an example of the relationship between evaluation of the timing of the lane change instruction with respect to another vehicle N2, and time. A vertical axis represents evaluation of the timing of a lane change instruction with respect to the other vehicle N2, and a horizontal axis represents time. As shown in FIG. 7C, the evaluation unit 13 gives a lower evaluation to the timing of the lane change instruction with respect to the other vehicle N2, when the lane change instruction is input at the timing when the possibility of coming into contact with the other vehicle N2 that travels on the oblique rear side of the virtual vehicle M is high. The evaluation unit 13 gives a high evaluation to the timing of the lane change instruction with respect to the other vehicle N2, when the lane change instruction is input at the timing when the other vehicle N2, higher in speed than the virtual vehicle M, is distanced. Thus, the evaluation unit 13 may evaluate one remote instruction based on a plurality of criteria. Here, the evaluation unit 13 evaluates the lane change instruction with two criteria; the lane change permission section L; and the other vehicle N2.

For example, the evaluation unit 13 uses an average of an evaluation value with respect to the lane change permission section L and an evaluation value with respect to the other vehicle N2 as the evaluation of the timing of the lane change instruction. The evaluation unit 13 may also use a total value of the evaluation value with respect to the lane change permission section L and the evaluation value with respect to the other vehicle N2 as the evaluation of the timing of the lane change instruction. The evaluation unit 13 may also use, as the evaluation of the timing of lane change instruction, a total value of the evaluation value with respect to the lane change permission section L and the evaluation value with respect to the other vehicle N2, the evaluation values being multiplied by predetermined coefficients, respectively. At this time, the evaluation value with respect to the other vehicle N2 may be weighted such that the evaluation value with respect to the other vehicle N2 has a larger influence on the total value than the influence of the evaluation value with respect to the lane change permission section L.

In addition, in the case where the remote commander R can select a vehicle speed adjustment instruction for adjusting the vehicle speed of virtual vehicle M to be the vehicle speed of the two or more another vehicles N2 that travel on the adjacent lane R6 at the time of the lane change, the evaluation unit 13 can give a high evaluation to the remote commander R when the remote commander R inputs the vehicle speed adjustment instruction before the lane change instruction. In the vehicle speed adjustment, the remote commander R may specify a numerical value.

The evaluation unit 13 may evaluate the remote commander R based on the situation of the virtual vehicle M in the remote instruction behavior section in which the virtual vehicle M behaves in response to the remote instruction. The remote instruction behavior section is a section from the position where the virtual vehicle M starts to behave in response to the remote instruction to the position where the virtual vehicle M ends the behavior. For example, the remote instruction behavior section may be defined as a section from the start position to the end position of deceleration of the virtual vehicle M in response to the deceleration instruction. The remote instruction behavior section may be defined as a section from the position where the virtual vehicle M starts to advance in response to an advance instruction of toward the intersection to the end position beyond the intersection. The remote instruction behavior section may be defined as a section from the position where the virtual vehicle M starts to change lanes in response to the lane change instruction to the end position of the lane change. In this case, the remote instruction behavior section is called a lane change section.

Here, the lane change sections A1, A2 shown in FIG. 7B is the sections in which the virtual vehicle M changes lanes in response to the lane change instruction issued by the remote commander R. The lane change sections A1, A2 are different in timing of the lane change instruction input by the remote commander R.

Specifically, P1 is a start position of the lane change section A1, P2 is an end position of the lane change section A1, P3 is a start position of the lane change section A2, and P4 is an end position of the lane change section A2. The end position P2 of the lane change section A1 is before the start position P3 of the lane change section A2. Although the lane change section A1 is included in the lane change permission section L, some of the lane change section A2 are out of the lane change permission section L.

In such a case, when the virtual vehicle M changes lanes in response to a lane change instruction issued by the remote commander R in the lane change section A1, the lane change can be completed without departing from the lane change permission section L unlike the case where the virtual vehicle M changes lanes in the lane change section A2. Hence, the evaluation unit 13 gives a high evaluation to the lane change instruction of the remote commander R.

Under the virtual situation where the virtual vehicle M stops at a temporary stop line, and the end position of the deceleration section that is the remote instruction behavior section in response to a deceleration instruction issued by the remote commander R is beyond a temporary stop line, the evaluation unit 13 may give a lower evaluation to the deceleration instruction than when the end position of the deceleration section is not beyond the temporary stop line.

The evaluation unit 13 may further evaluate the remote commander R based on the content of the remote instruction. When the remote commander R does not issue the deceleration instruction at an intersection where there are concerns of running-out from a side road, or the like, the evaluation unit 13 may give a low evaluation to the remote commander R. For example, under the virtual situation of entering an intersection of poor visibility, the evaluation unit 13 may give a low evaluation to the remote commander R when the remote commander R inputs an advance instruction without issuing a stop instruction. The intersection of poor visibility refers to an intersection where it is difficult to recognize the situation of the crossing roads at the time of entering the intersection due to the presence of a wall or the like.

Furthermore, when a low-speed advance instruction for advancing the virtual vehicle M at low speed is selectable in addition to the advance instruction, and the remote commander R inputs the advance instruction instead of the low-speed advance instruction at the intersection of poor visibility, the evaluation unit 13 may give a low evaluation to the remote commander R. When the surrounding visibility is improved (for example, when the range covered with obstacles in the detection range of the sensor of the virtual vehicle M becomes less than a fixed value), the virtual vehicle M that advanced in response to the low-speed advance instruction may automatically return to normal speed.

Under the virtual situation where the virtual vehicle M is about to pass through the traffic signal, and the traffic signal is in a passing permission state (for example, green light), but leading vehicles stop due to traffic congestion or the like, the evaluation unit 13 may give a high evaluation to the remote commander R when the remote commander R inputs a stop instruction at the timing that prevents the virtual vehicle M from stopping on a pedestrian crossing or in the intersection. Under the virtual situation where the virtual vehicle M approaches a traffic signal, and the traffic signal is in a passing permission state, but the virtual vehicle M is going to stop, the evaluation unit 13 may give a high evaluation to the remote commander R when the remote commander R determines to issue an advance instruction based on visual observation.

Under the virtual situation where the virtual vehicle M approaches a traffic signal, and the virtual vehicle M is going to pass the traffic signal although the traffic signal is in a passage inhibiting state (for example, red traffic signal), the evaluation unit 13 may give a high evaluation to the remote commander R when the remote commander R determines to issue a stop instruction based on visual observation. The remote commander R may issue a remote instruction for only notifying the result of visual recognition of the traffic signal instead of the remote instruction for the behavior of the virtual vehicle M.

When automatic control of a blinker is not performed in the virtual vehicle M, the evaluation unit 13 may evaluate the remote commander R from the timing of issuing a blinker lighting instruction. For example, the evaluation unit 13 may evaluate the remote commander R from the timing of issuing the blinker lighting instruction based on a remaining distance to an intersection involving right and left turns or the remaining time to reach the intersection.

Under the virtual situation where the virtual vehicle M is going to turn right at an intersection, the evaluation unit 13 may give a high evaluation to the remote commander R, when the remote commander R recognizes an approaching oncoming vehicle and inputs a stop instruction so as to stop the virtual vehicle M before the stop line that is to wait for right-turn. Under the virtual situation where the virtual vehicle M is going to turn right at an intersection, the evaluation unit 13 may give a low evaluation to the remote commander R, when the remote commander R inputs an advance instruction regardless of the presence of an approaching oncoming vehicle or the presence of a pedestrian passing a pedestrian crossing on the road.

Even when an oncoming vehicle is waiting for right-turn, there is a possibility that the oncoming vehicle is followed by another vehicle that is intended to travel straight. Accordingly, the evaluation unit 13 may give a low evaluation to the remote commander R, when the remote commander R inputs an advance instruction, without consideration to the possibility that there may be an oncoming vehicle intended to travel straight.

There may be cases where the remote commander R can be evaluated based only on the content of the remote instruction regardless of the timing of the input of the remote instruction. Here, assume the virtual situation where the virtual vehicle M is going to turn right at an intersection, and the traffic signal is in a passing permission state, but an oncoming vehicle stops ahead of the virtual vehicle M without entering the intersection because a portion of an oncoming lane beyond the intersection is congested. In this case, since the situation does not depend on the position of the virtual vehicle M and the oncoming vehicle nor the time, the remote commander R is appropriately evaluated based on the content of the remote instruction. In this situation, for example, when the remote commander R inputs a low-speed advance instruction, the evaluation unit 13 gives a higher evaluation to the remote commander R than when the remote commander R inputs an advance instruction (advance instruction at normal speed). In the above situation, the remote commander R needs to be cautious of running-out of a two wheeler, or the like, from a region (other side of the oncoming vehicle) that is out of view from the virtual vehicle M due to the presence of the oncoming vehicle in the stopped state. Accordingly, the evaluation unit 13 gives a higher evaluation to the low-speed advance instruction than to the advance instruction.

Under the virtual situation of entering a construction section, the evaluation unit 13 may give a high evaluation to the remote commander R, when the remote commander R issues a deceleration instruction or a stop instruction so as to be able to appropriately check a flag signal given by a guard, or the like. When the deceleration instruction is issued before entering the construction section, the evaluation unit 13 may give a high evaluation to the remote commander R. When the stop instruction is issued at the timing that enables the virtual vehicle M to stop before entering the construction section, the evaluation unit 13 may give a high evaluation to the remote commander R. The evaluation unit 13 may give a higher evaluation to the remote commander R, as the advance instruction is issued sooner after the flag signal by the guard, or the like, indicates permission to pass.

Assume the case where, under the virtual situation of entering a railroad crossing, a crossing gate is lifted, but leading vehicles beyond the railroad crossing are congested, and therefore if entering the railroad crossing, the virtual vehicle M will end up stopping inside the crossing. In this case, the evaluation unit 13 may give a high evaluation to the remote commander R when the remote commander R issues a stop instruction before entering the railroad crossing. In the case where, under the virtual situation of entering a railroad crossing, the crossing gate is lifted, and no leading vehicle is stopped, the evaluation unit 13 may give a higher evaluation to the remote commander R, as the advance instruction is issued sooner.

Under the virtual situation of overtaking a low-speed leading vehicle, the evaluation unit 13 may give a higher evaluation to the remote commander R, as the possibility of collision with another vehicle is lower during an overtaking period that is a remote instruction behavior period in response to an overtaking instruction of the remote commander R. The remote commander R can lower the possibility of collision with another vehicle by issuing the overtaking instruction at the timing when there is enough space between other vehicles in the lane change destination, for example. When there are separate instructions: an overtaking instruction; and a lane change instruction for returning to an original lane after overtaking, the evaluation unit 13 may evaluation the instructions separately. The evaluation methods described in FIG. 7A to FIG. 7C may be applied to the lane change instruction for returning to the original lane.

In addition, the evaluation unit 13 may evaluate the remote commander R based on a concentration degree of the remote commander R. The concentration degree is the degree of concentration of the remote commander R on monitoring the virtual vehicle M. The evaluation unit 13 may obtain the concentration degree of the remote commander R based on an imaged image from a remote commander camera that images the remote commander R, for example. The evaluation unit 13 may recognize the concentration degree of the remote commander R as a low value, when it is recognized that the remote commander R faces other than the display of the information output unit 3a or the instruction input unit 3b. The evaluation unit 13 may recognize the concentration degree of the remote commander R as a higher value, as the remote commander R grips the lever La of the instruction input unit 3b sooner after the virtual situation is shown. The concentration degree of the remote commander R can be recognized by using the technique of recognizing the degree of concentration of driving by the driver of a vehicle.

When the concentration degree of the remote commander R is equal to or greater than a concentration degree threshold, the evaluation unit 13 gives a higher evaluation to the remote commander R than when the concentration degree is less than the concentration degree threshold. The concentration degree threshold is a threshold of a preset value. The evaluation unit 13 may give a higher evaluation to the remote commander R, as the concentration degree of the commander R is higher.

The evaluation unit 13 may evaluate the remote commander R based on an awakening degree of the remote commander R. The awakening degree is the degree indicating that the remote commander R is awakened and is not lightheaded due to lack of sleep, or the like. The evaluation unit 13 recognizes the awakening degree of the remote commander R based on, for example, how opened the eyes of the remote commander R is, the frequency of blinks, eye movements, or the like. The evaluation unit 13 may recognize the awakening degree from information, such as cardiac beat information and brain wave information, of the remote commander R. The awakening degree of the remote commander R can also be recognized by using the technique of recognizing the awakening degree of the driver of the vehicle.

When the awakening degree of the remote commander R is equal to or greater than an awakening degree threshold, the evaluation unit 13 gives a higher evaluation to the remote commander R than when the awakening degree is less than the awakening degree threshold. The awakening degree threshold is a threshold of a preset value. The evaluation unit 13 may give a higher evaluation to the remote commander R, as the awakening degree of the commander R is higher.

When the evaluation unit 13 evaluates the remote commander R, the feedback unit 14 feeds back the evaluation to the remote commander R. The feedback unit 14 notifies the remote commander R of the evaluation through the information output unit 3a of the commander interface 3. The feedback unit 14 may notify the evaluation for every remote instruction by the remote commander R, or may notify the evaluation for every virtual situation. The feedback unit 14 may feedback the evaluation, after the remote commander R ends the work of the remote instruction (for example, the end of the work of the day).

The feedback unit 14 may output one of OK and NG as feedback, or may output gradual evaluation. The feedback unit 14 may output a difference between the timing of the remote instruction by the remote commander R and optimal timing in the virtual situation. The vehicle remote instruction training device 1 does not need to include the feedback unit 14. The vehicle remote instruction training device 1 does not need to feed back on the spot.

Process of Vehicle Remote Instruction Training Device

Figure 8:
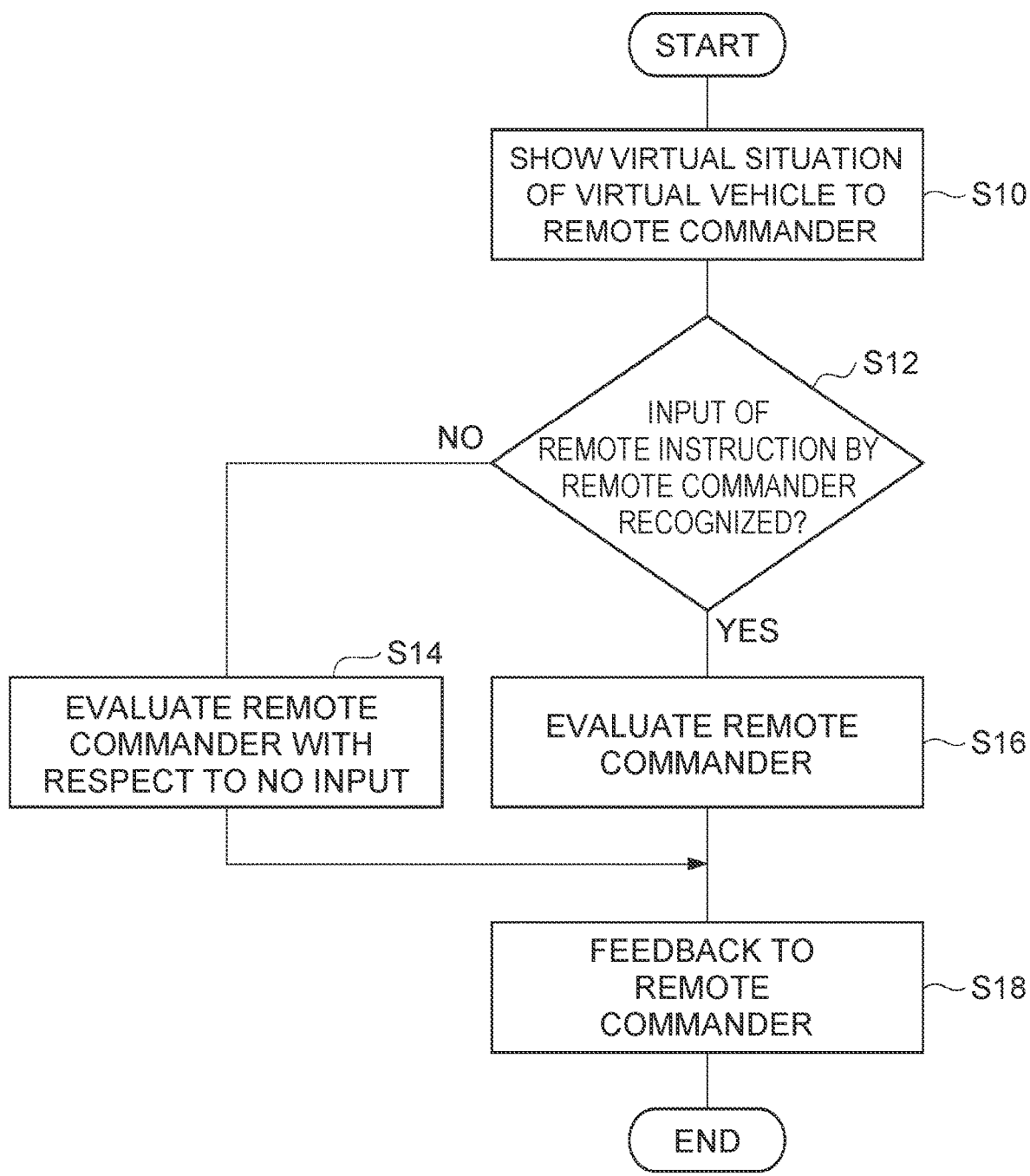
FIG. 8 is a flowchart illustrating an example of a remote commander determination process.

Next, the process of the vehicle remote instruction training device 1 according to the present embodiment will be described with reference to FIG. 8. FIG. 8 is a flowchart illustrating an example of a remote commander determination process. The remote commander evaluation process is executed during working hours when the remote commander R repeats a general remote instruction operation, for example. The remote commander evaluation process may be executed in predetermined training time.

As shown in FIG. 8, the remote instruction training server 10 of the vehicle remote instruction training device 1 shows to the remote commander R the virtual situation of a virtual vehicle with the virtual situation display unit 11 as S10. The virtual situation display unit 11 shows the virtual situation to the remote commander R through the information output unit 3a.

In S12, the remote instruction training server 10 recognizes whether or not the remote commander R inputs a remote instruction with the remote instruction input recognition unit 12. The remote instruction input recognition unit 12 recognizes the content of the remote instruction and the timing of the remote instruction input by the remote commander R, based on the operation on the instruction input unit 3*b* performed by the remote commander R. When the remote commander R does not input the remote instruction (S12: NO), the remote instruction training server 10 shifts to S14. When the remote commander R inputs the remote instruction (S12: YES), the remote instruction training server 10 shifts to S16.

In S14, the remote instruction training server 10 evaluates the remote commander R with respect to no input with the evaluation unit 13. The evaluation unit 13 evaluates the remote commander R based on the fact that the remote commander R has not input the remote instruction in the virtual situation of the virtual vehicle. For example, when the remote commander R does not issue a deceleration instruction at an intersection where there are concerns of running-out from a side road, or the like, the evaluation unit 13 may give a low evaluation to the remote commander R. Then, the remote instruction training server 10 shifts to S18.

In S16, the remote instruction training server 10 evaluates the remote commander R with the evaluation unit 13. The evaluation unit 13 evaluates the remote commander R based on the timing at which the remote commander R issues the remote instruction in the virtual situation of the virtual vehicle. The evaluation unit 13 may evaluate the remote commander R based on the situation of the virtual vehicle M in a remote instruction behavior period in which the virtual vehicle M behaves in response to a remote instruction or on the situation of the virtual vehicle M in a remote instruction behavior section in which the virtual vehicle M behaves in response to the remote instruction. Then, the remote instruction training server 10 shifts to S18.

In S18, the remote instruction training server 10 performs feedback to the remote commander R with the feedback unit 14. The feedback unit 14 notifies the remote commander R of the evaluation through the information output unit 3*a* of the commander interface 3. Then, the remote instruction training server 10 ends the process of this time.

The remote instruction training server 10 does not need to perform the process of S14. When the input of the remote instruction by the remote commander is not recognized, the remote instruction training server 10 may end the process, without performing evaluation and feedback.

The vehicle remote instruction training device 1 according to the present embodiment described in the foregoing can display the virtual situation of the virtual vehicle M to the remote commander R, and evaluate the remote commander R based on the timing at which the remote commander R has issued a remote instruction with respect to the virtual situation. Accordingly, it is possible to evaluate whether the timing at which the remote commander has issued the remote instruction is appropriate or inappropriate. Hence, it is possible to appropriately perform remote instruction training for the remote commander. The vehicle remote instruction training device 1 uses the commander interface 3, used for issuing a remote instruction to the actual autonomous vehicle 2, to show the virtual situation to the remote commander R and to recognize an input of the remote instruction by the remote commander R. Accordingly, as compared with the case where the remote instruction in the virtual situation is evaluated under completely different environments from the case of issuing a remote instruction to the actual autonomous vehicle 2, it is possible to evaluate the remote commander in the state closer to the case of issuing the remote instruction to the actual autonomous vehicle 2.

Since the vehicle remote instruction training device 1 evaluates the remote instruction in the virtual situation in the interval of the monitor periods for monitoring the actual autonomous vehicle 2. Accordingly, as compared with the case where the remote instruction in the virtual situation is evaluated on different dates separately from the monitor period for monitoring the actual autonomous vehicle 2, it can be expected that the remote commander R can be evaluated in the same state as in monitoring the actual autonomous vehicle 2. Therefore, more appropriate evaluation of the remote commander R can be achieved.

The vehicle remote instruction training device 1 can evaluate the remote commander R, based on the situation of the virtual vehicle M during the remote instruction behavior period in which the virtual vehicle M behaves in response to the remote instruction or in the remote instruction behavior section in which the virtual M vehicle behaves in response to the remote instruction, as well as on the timing of the remote instruction. Therefore, it is possible evaluate that the remote commander R has issued the remote instruction in consideration of the situation of the virtual vehicle M after issuance of the remote instruction.

With the vehicle remote instruction training device 1, when the virtual situation is shown as a situation where the virtual vehicle enters a non-signal intersection with a priority road from a non-priority road, the remote commander is evaluated based on the timing of a deceleration instruction or a stop instruction by the remote commander and on the timing of an advance instruction by the remote commander. Therefore, it is possible to evaluate the remote commander based on a combination of the content and the timing of the remote instruction corresponding to the virtual situation.

With the vehicle remote instruction training device 1, when the virtual situation is shown as a situation where the virtual vehicle enters a non-signal intersection with a priority road from a non-priority road and where there is another vehicle travels on the priority road toward the non-signal intersection, the remote commander is evaluated based on the possibility of collision between the virtual vehicle and the other vehicle during the intersection entry period in response to the advance instruction of the remote commander. Therefore, it is possible appropriately evaluate whether the remote commander has taken into consideration the relationship between the virtual vehicle and the other vehicle after issuance of the advance instruction.

With the vehicle remote instruction training device 1, when the virtual situation is shown as the situation where the virtual vehicle changes lanes, the remote commander is evaluated based on the timing of the lane change instruction, the lane change section, and the lane change permission section. Therefore, it is possible appropriately evaluate whether the remote commander has taken into consideration whether the virtual vehicle after issuance of the lane change instruction can change lanes in the lane change permission section.

Although the embodiment of the present disclosure has been described in the foregoing, the present disclosure is not limited to the embodiment disclosed. The present embodiment may be carried out as the embodiment disclosed, as well as in various aspects to which various arrangements and modifications are applied based on the knowledge of those skilled in the art.

For example, the vehicle remote instruction training device 1 does not need to constitute part of the vehicle remote instruction system 100. The vehicle remote instruction training device 1 may be used alone. In that case, the commander interface 3 is also configured as a training interface.

Remote instruction training for beginners may be restricted to the advance instruction, or the like. When there is only one type of remote instruction, the remote commander R is evaluated based on only the timing of the remote instruction.

What is claimed is:

1. A vehicle remote instruction training device that trains a remote commander who issues a remote instruction to an actual autonomous vehicle, the vehicle remote instruction training device comprising:
    a commander interface including
        an information output user interface configured to show a situation of the actual autonomous vehicle to the remote commander, and
        an instruction input user interface for the remote commander to input the remote instruction to the actual autonomous vehicle; and
    a server provided separately from the commander interface and connected with the commander interface, the server including
        an input-output device for a user different from the remote commander, and
        a processor configured to
            allocate, to the remote commander, a plurality of monitor periods in which the remote commander issues the remote instruction to the actual autonomous vehicle such that the actual autonomous vehicle drives along a trajectory corresponding to the remote instruction,
            show, during an interval between monitor periods of the plurality of monitor periods, through the information output user interface, a virtual situation with time variation to the remote commander, the virtual situation being a situation of a virtual vehicle that is a virtual autonomous vehicle, the remote commander being a trainee,
            recognize an input of the remote instruction input into the instruction input user interface by the remote commander,
            obtain a concentration degree of the remote commander based on a timing of the remote commander gripping the instruction input user interface after the virtual situation is shown, and
            evaluate the remote commander based on the concentration degree of the remote commander, and a timing or a content of the remote instruction,
    wherein the processor is configured to show to the remote commander, as the virtual situation, same information as a case of issuing the remote instruction to the actual autonomous vehicle, and not to indicate to the remote commander that the vehicle remote instruction training device is in a training mode.

2. The vehicle remote instruction training device according to claim 1, wherein the processor is configured to evaluate the remote commander, based on the situation of the virtual vehicle during a remote instruction behavior period when the virtual vehicle behaves in response to the remote instruction, or on the situation of the virtual vehicle in a remote instruction behavior section where the virtual vehicle behaves in response to the remote instruction.

3. The vehicle remote instruction training device according to claim 1, wherein the processor is configured to, when the virtual situation is shown as a situation where the virtual vehicle enters a non-signal light intersection with a priority road from a non-priority road, evaluate the remote commander based on timing of a deceleration instruction or a stop instruction of the remote commander and on timing of an advance instruction of the remote commander.

4. The vehicle remote instruction training device according to claim 2, wherein the processor is configured to, when the virtual situation is shown as a situation where the virtual vehicle enters a non-signal light intersection with a priority road from a non-priority road and where there is another vehicle that travels on the priority road toward the non-signal light intersection, evaluate the remote commander based on a possibility of collision between the virtual vehicle and the other vehicle during an intersection entry period that is the remote instruction behavior period in response to an advance instruction of the remote commander.

5. The vehicle remote instruction training device according to claim 2, wherein the processor is configured to, when the virtual situation is shown as a situation where the virtual vehicle changes lanes, evaluate the remote commander based on timing of a lane change instruction of the remote commander, a lane change section used as the remote instruction behavior section in response to the lane change instruction, and a lane change permission section predetermined on a road where the virtual vehicle travels.

6. The vehicle remote instruction training device according to claim 1, wherein the processor is configured to show, when i) a first monitor period and a second monitor period is allocated to the remote commander as the monitor periods and ii) an interval between the first monitor period and the second monitor period is equal to or longer than a predetermined period, show the virtual situation to remote commander during the interval between the first monitor period and the second monitor period.

7. The vehicle remote instruction training device according to claim 1, wherein the server is provided in a mobile object.

8. The vehicle remote instruction training device according to claim 1, wherein the processor is configured to:
    increase a value of the concentration degree when the remote commander grips the instruction input user interface within a predetermined time period after the virtual situation is shown, and
    when the concentration degree is equal to or greater than a threshold, give a higher evaluation to the remote commander than when the concentration degree is below the threshold.

* * * * *